United States Patent [19]
Wakimoto et al.

[11] Patent Number: 5,291,329
[45] Date of Patent: Mar. 1, 1994

[54] APPARATUS FOR RECORDING AN IMAGE

[75] Inventors: Zenji Wakimoto; Masahide Okazaki, both of Kyoto, Japan

[73] Assignee: Dainippon Screen Mfg. Co., Ltd., Kyoto, Japan

[21] Appl. No.: 906,539

[22] Filed: Jun. 30, 1992

[30] Foreign Application Priority Data

Jul. 15, 1991 [JP] Japan .................. 3-201406

[51] Int. Cl.$^5$ .............................................. G02C 26/10
[52] U.S. Cl. ..................................... 359/362; 359/662
[58] Field of Search ................ 359/662, 744, 618, 362

[56] References Cited

U.S. PATENT DOCUMENTS

| | | | |
|---|---|---|---|
| 4,681,394 | 7/1987 | Noguchi | 359/215 |
| 4,743,091 | 5/1988 | Gelbart | 350/252 |
| 4,810,068 | 3/1989 | Shimazu et al. | 359/305 |
| 5,099,358 | 3/1992 | Okazaki | 359/503 |

Primary Examiner—Edward K. Look
Assistant Examiner—F. Daniel Lopez
Attorney, Agent, or Firm—Brumbaugh, Graves, Donohue & Raymond

[57] ABSTRACT

An apparatus for recording an image with a plurality of laser beams on a recording surface comprises a plurality of laser source units each generating a laser beam and a first lens for directing the laser beam from each one of the plurality of laser source units to the recording surface. In the apparatus, the laser source units are each disposed on a holding member in such a manner that the principal ray of the laser beam therefrom passes through a front focal point of the first lens. Thus, the apparatus is advantageous in that it is not necessary to employ an enlarged lens despite increase in the number of the laser source units, or the channel numbers.

8 Claims, 10 Drawing Sheets

APPARATUS FOR RECORDING AN IMAGE

BACKGROUND OF THE INVENTION

1. Field of the Invention

The present invention relates to an apparatus for recording an image on a recording surface with a multibeam, i.e., a plurality of laser beams.

2. Description of the Background Art

FIG. 1 shows a first example of a conventional apparatus for recording an image with a multibeam (laser beams). The first conventional apparatus comprises a plurality of laser source units 1 mounted at equal intervals on a holding member A having a spherical surface. For convenience of description, FIG. 1 shows only one of the laser source units 1.

The laser source unit comprises a semiconductor laser 1a and a collimator lens 1b. The collimator lens 1b shapes a laser beam from the semiconductor laser 1a into a collimated laser beam LB and directs the laser beam LB to an afocal optical system AL1 such that the principal ray of the laser beam LB passes through the front principal point of the lens L1, the afocal optical system AL1 being formed by the lens L1 and another lens L2. The laser beam LB is expanded by the afocal optical system AL1 so as to have an enlarged beam diameter, and then focused onto a recording surface 3 through a lens L3.

Laser beams from the other laser source units 1 are focused onto the recording surface 3 in a similar manner. Thus, focused with the laser beams, a plurality of beam spots are formed at a time on the recording surface 3.

FIG. 2 shows a second example of a conventional apparatus for recording an image with a multibeam. The second conventional apparatus comprises a plurality of laser source units 1 disposed so as to be equally distant from each other, an afocal optical system AL1 formed by lenses L1 and L2 and an afocal optical system AL2 formed by lenses L3 and L4. FIG. 2 also shows only one of the laser source units 1. In FIG. 2, a laser beam LB from the laser source unit 1 enters the afocal optical system AL1 such that the principal ray thereof advances parallel to an optical axis Z. The laser beam LB is thereafter focused onto a recording surface 3 through the afocal optical systems AL1 and AL2.

Laser beams from the other laser source units 1 not shown in FIG. 2 are focused onto the recording surface 3 in a similar manner. Thus, a plurality of beam spots are formed at a time on the recording surface 3.

Due to the structures as described above, the first and the second conventional recording apparatuses must include an increased size lens to form a greater number of beam spots on the recording surface 3, i.e., to increase channel numbers. In the second conventional apparatus, for instance, the number of the laser source units 1 must be increased in a direction perpendicular to the optical axis Z in order to ensure a larger numbers of the channels (FIG. 2). To accommodate to the increase in the number of the laser source units 1, the lens L1 must be larger. When the lens L1 has an enlarged size, aberration caused by the same intensifies and manufacturing costs thereof swell up. In addition, the size of the recording apparatus must be also large enough to house the enlarged lens L1.

The first conventional apparatus of FIG. 1 is faced with the same problems because the lens L2 must be enlarged to increase the numbers of the channels. In addition, the first conventional apparatus has still another problem. Since the laser source units 1 in the equidistant relation are mounted on the holding member A having the spherical surface, distances between beam spots on the recording surface 3 will not be equal. As a result, raster scanning using the first conventional apparatus will not produce an intended image.

SUMMARY OF THE INVENTION

The present invention is directed to an apparatus for recording an image with a plurality of laser beams on a recording surface. The apparatus comprises: a plurality of laser source units each emitting a laser beam; a holding member for holding the laser source units; and a first lens, disposed between the laser source units and the recording surface, for directing the laser beam from each of the laser source units to the recording surface, wherein the plurality of laser source units are each disposed in such a manner that the principal ray of the laser beam therefrom passes through a front focal point of the first lens.

Preferably, the holding member has a spherical surface with a center point which coincides with the front focal point of the first lens, the laser source units are arranged at equal intervals in a direction on the spherical surface, and the first lens includes an $f\theta$ lens.

It is possible that the apparatus comprises an afocal optical system located between the first lens and the recording surface.

Preferably, the holding member has a spherical surface with a center point which coincides with the front focal point of the first lens, the laser source units are arranged at equal intervals in a direction on the spherical surface, and the afocal optical system includes an $f\theta$ lens immediately close to the recording surface.

According to an aspect of the present invention, the apparatus satisfies the following relationship:

$$\theta = \tan^{-1}(n \cdot P1 / f1)$$

where
- $\theta$ is an angle between an optical axis of the first lens and a line drawn by projecting the principal ray of the laser beam onto a plane which contains the optical axis,
- n is a natural number,
- P1 is a constant,
- f1 is a focal length of the first lens.

According to another aspect of the present invention, the holding member has a flat surface which is perpendicular to an optical axis of the first lens, and the laser source units are arranged at equal intervals in a direction on the flat surface.

Accordingly, an object of the present invention is to obtain a small apparatus for recording an image with laser beams even if the numbers of the channel is increased.

Another object of the present invention is to offer such an apparatus at low manufacturing costs.

Still another object of the present invention is to obtain an apparatus for recording an image with laser beams in which distances between beam spots on a recording surface are equal.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
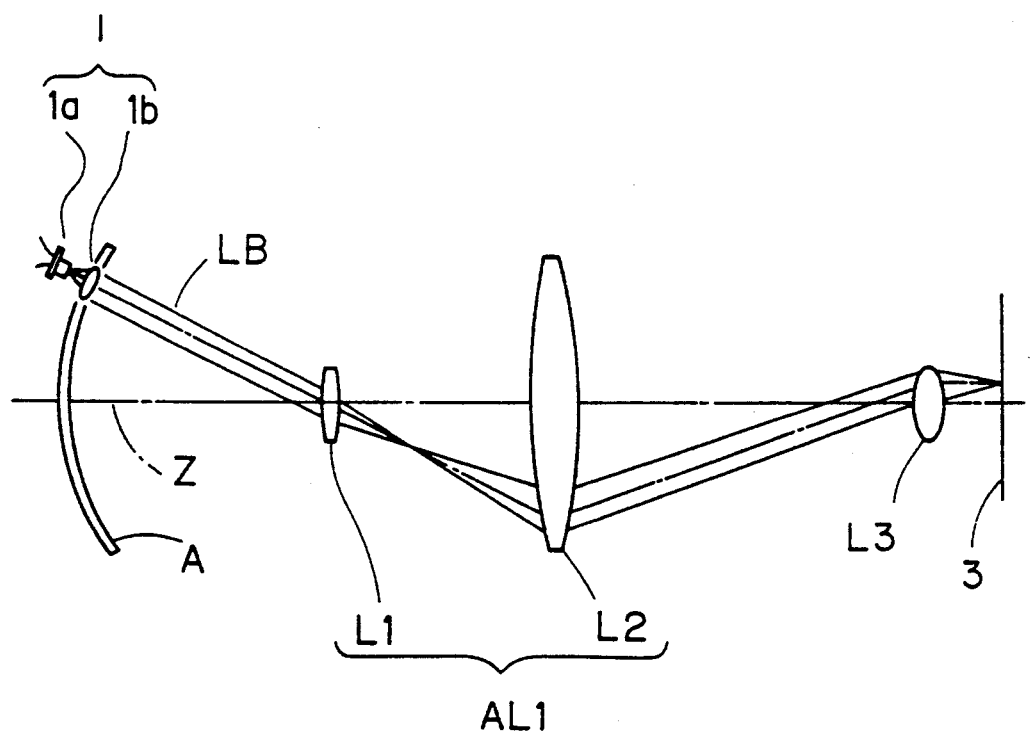
FIG. 1 is a schematic diagram of a first example of a conventional apparatus for recording an image.
Figure 2:
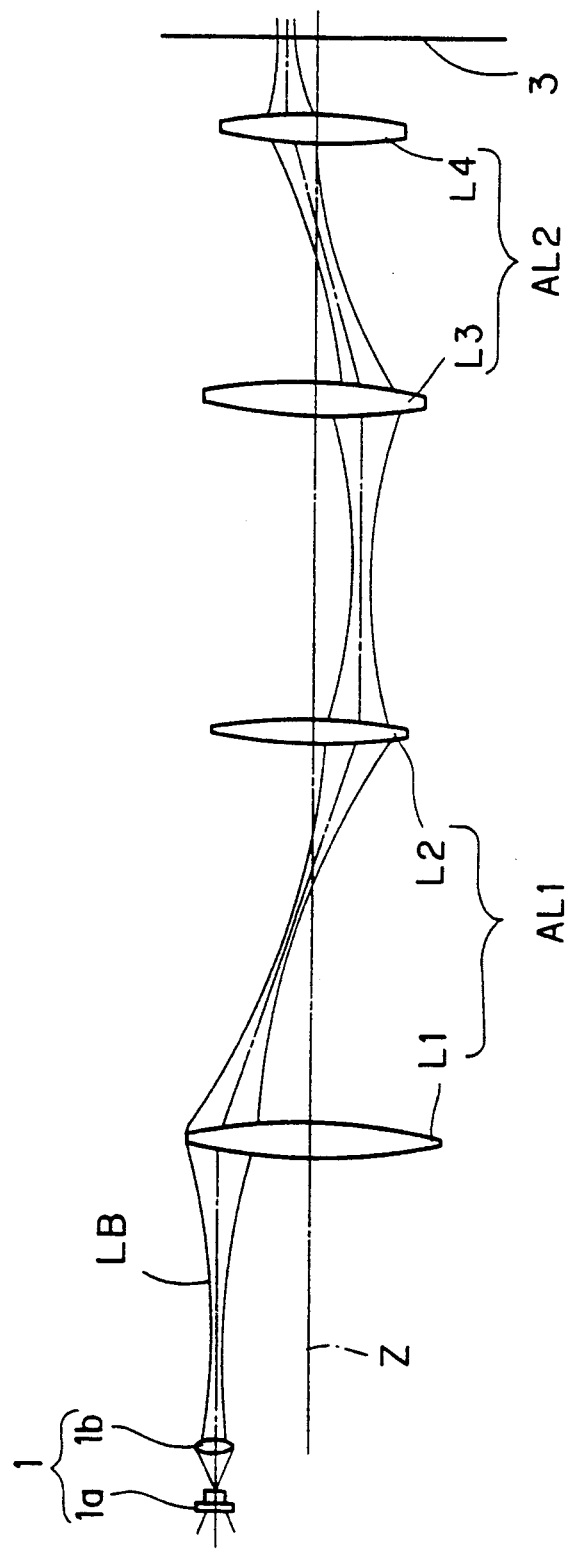
FIG. 2 is a schematic diagram of a second example of a conventional apparatus for recording an image.
Figure 3:
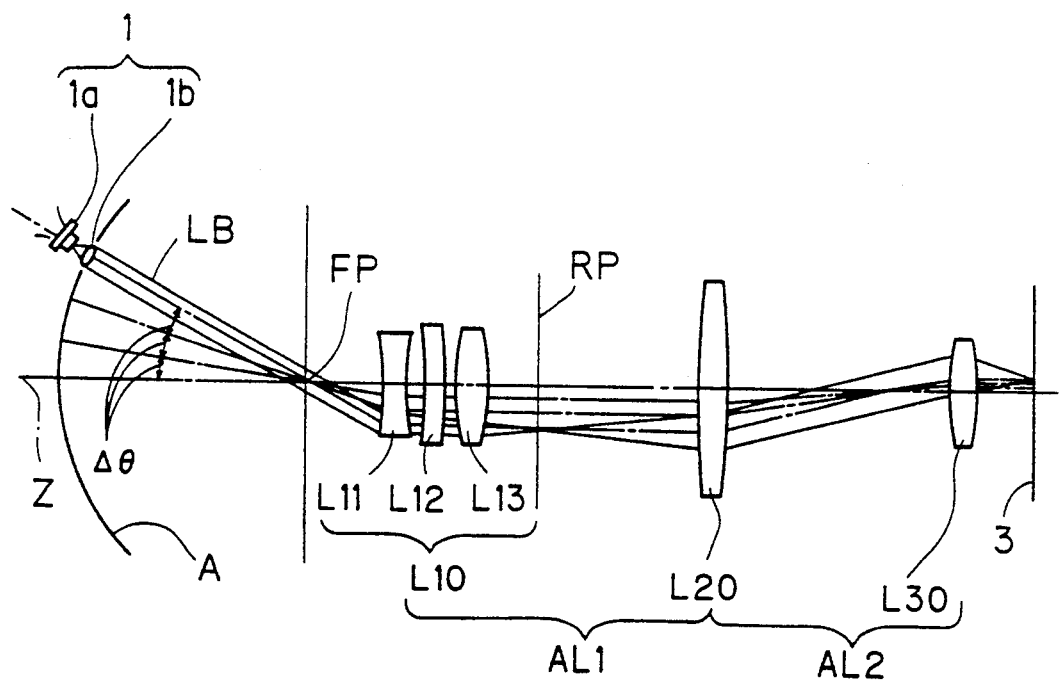
FIG. 3 is a schematic diagram of an apparatus for recording an image according to a first preferred embodiment of the present invention.
Figure 4:
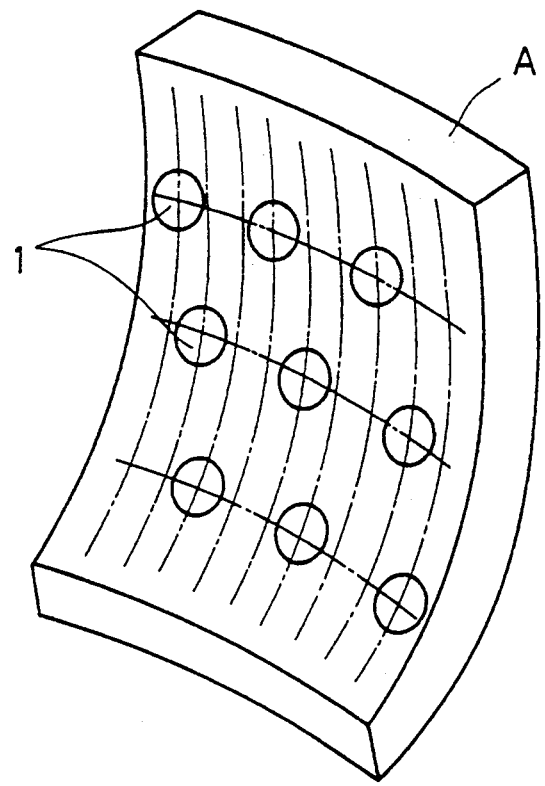
FIGS. 4 and 5 are a perspective view and a plan view showing an arrangement of laser source units, respectively.
Figure 5:
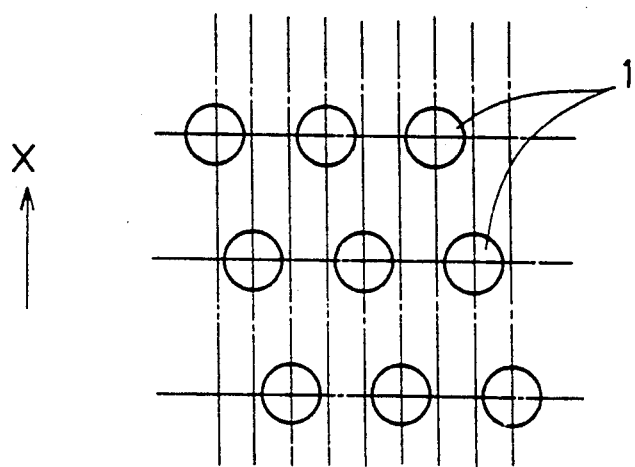

FIG. 3 shows an apparatus for recording an image with a multibeam (laser beams) according to a first preferred embodiment of the present invention. FIGS. 4 and 5 are a perspective view and a plan view, respectively, showing how laser source units are arranged. The apparatus comprises a plurality of laser source units 1, an $f\theta$ lens group L10, a lens L20 and a lens L30. The $f\theta$ lens group L10 is formed by lenses L11, L12 and L13.

The laser source units 1 each comprise a semiconductor laser 1a and a collimator lens 1b (FIG. 3) and are mounted one equidistant from the other in a two dimensional manner on a holding member A having a spherical surface. The center point of the spherical surface coincides with a front focal point FP of the $f\theta$ lens group L10. More precisely, the laser source units 1 overlap each other in a main scanning direction X as shown in FIG. 5. The reason for adopting the overlapping arrangement is as follows. If the laser source units 1 are arranged in a non-overlapping relation with respect to the direction X, laser beams therefrom will be separated from each other due to mechanical dimension constraint of the laser source units 1. When a multibeam consisting of the laser beams thus separated from each other is scanned on a recording surface, a scanning error results that a recorded image includes a blank although it is wished otherwise. In addition to the above, the apparatus of the first preferred embodiment also requires that each laser source unit 1 is disposed such that the principal ray of a laser beam therefrom passes through the front focal point FP of the $f\theta$ lens group L10.

The $f\theta$ lens group L10, the lens L20 and the lens L30 are arranged on an optical axis Z in that order (FIG. 3). In the first preferred embodiment, a rear focal plane RP of the $f\theta$ lens group L10 coincides with a front focal plane of the lens L20. Thus, the $f\theta$ lens group L10 and the lens L20 form an afocal optical system AL1. Likewise, a rear focal plane of the lens L20 and a front focal plane of the lens L30 coincide with each other. Thus, the lens L20 and the lens L30 form an afocal optical system AL2. A rear focal plane of the lens L30 approximately coincides with a recording surface 3.

Next, operation of the apparatus of the first preferred embodiment will be described in connection with FIG. 3. The collimator lens 1b shapes a laser beam from the semiconductor laser 1a into a collimated laser beam LB. The laser beam LB impinges upon the $f\theta$ lens group L10 such that the principal ray thereof passes through the front focal point FP of the $f\theta$ lens group L10. Because of optical characteristics of the $f\theta$ lens group L10, a laser beam from the $f\theta$ lens group L10 is parallel to the optical axis Z and a distance between the laser beam and the optical axis Z is proportional to the incident angle of the laser beam to the $f\theta$ lens group L10.

Since the laser source units 1 are arranged at equal intervals on the holding member A, angles between the laser beams LB incident upon the $f\theta$ lens group L10 are equally $\Delta\theta$. Hence, distances between the laser beams from the $f\theta$ lens group L10 become also equal.

The laser beams from the $f\theta$ lens group L10 having equal beam pitches therebetween each converge on the rear focal plane RP of the $f\theta$ lens group L10. As a result, a plurality of intermediate images, i.e., beam spots are formed at equal intervals on the rear focal plane RP. The beam spots are each reduced to an appropriate magnification by the afocal optical system AL2, and focused on the recording surface 3 as an image. Hence, the beam spots on the recording surface 3 are at equal intervals.

As heretofore described, the first preferred embodiment requires that the principal ray of the laser beam LB from each laser source unit 1 passes through the front focal point FP of the $f\theta$ lens group L10 on the way to the $f\theta$ lens group L10. Hence, the apparatus is advantageous in that it is not necessary to employ an enlarged lens despite increase in the number of the laser source units 1, or the channel numbers. In light of the advantage associated with the channel number increase, the focal distance of the $f\theta$ lens L10 is desirably shorter than the radius of curvature of the spherical surface. The shorter the focal length of the $f\theta$ lens group L10 is, the deeper the advantage is appreciated.

Equally meritorious, beam spots on the recording surface 3 are equidistant from each other since the laser source units 1 are mounted at equal intervals on the holding member A and the laser beams LB from the laser source units 1 impinge upon the $f\theta$ lens group L10.

Figure 6:
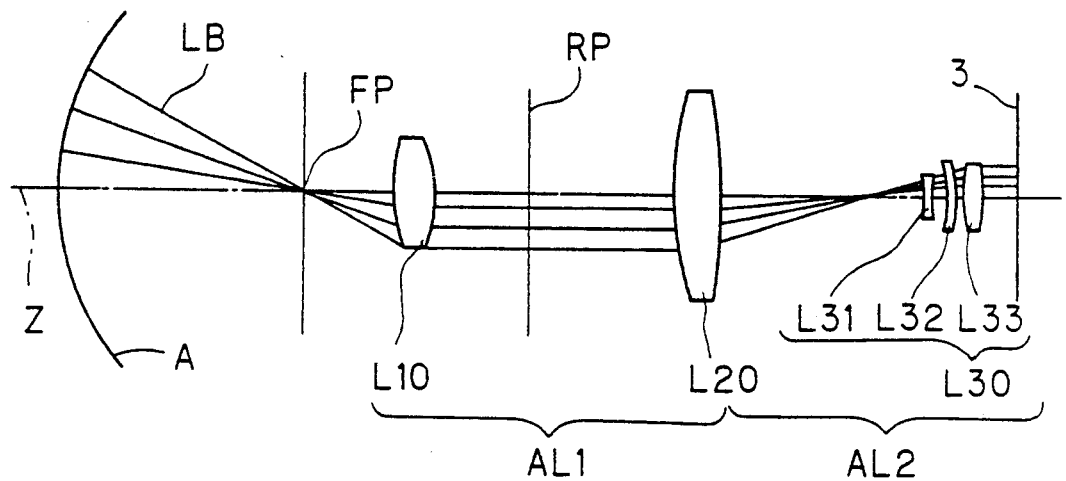
FIG. 6 is a schematic diagram of an apparatus for recording an image according to a second preferred embodiment of the present invention.

FIG. 6 shows an apparatus for recording an image with laser beams according to a second preferred embodiment of the present invention. In the apparatus, a lens L10 is formed by a regular lens, e.g., a lens which satisfies y=f·tan θ where θ is an angle of incidence and y is an exit height of a beam spot on an image surface. A lens group L30 is formed by lenses L31, L32 and L33 and has the fθ characteristics. The apparatus of the second preferred embodiment is otherwise the same as the apparatus of the first preferred embodiment.

In the apparatus of the second preferred embodiment, laser beams LB from a plurality of laser source units 1 which are arranged equidistant from each other pass through the lens L10 and the lens L20 to be thence guided to the fθ lens group L30. The laser beams LB incident upon the fθ lens group L30 are at equiangular interval. Hence, beam spots formed on the recording surface 3 through the fθ lens group L30 are equidistant from each other.

The lens L10 is disposed so as to allow the principal ray of the laser beam LB to pass through a front focal point FP of the lens L10, similarly to the first preferred embodiment, and therefore, the second preferred embodiment also successfully prevents size increase of the apparatus due to increase in the channel numbers.

Figure 7:
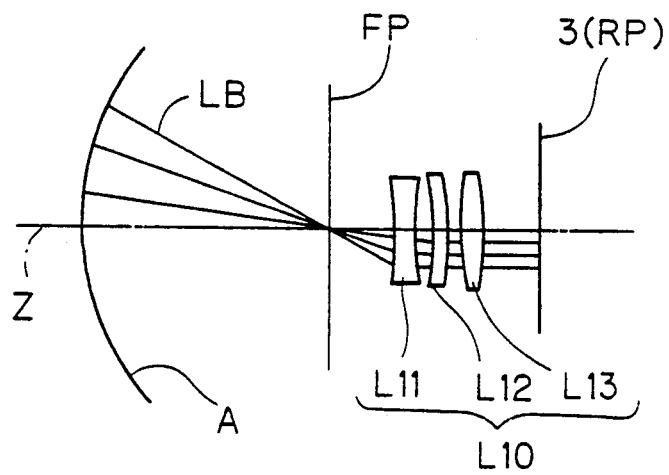
FIG. 7 is a schematic diagram of an apparatus for recording an image according to a third preferred embodiment of the present invention.

FIG. 7 shows an apparatus for recording an image with laser beams according to a third preferred embodiment of the present invention. The apparatus of the third preferred embodiment differs from the apparatus of the first preferred embodiment only in that the afocal optical system formed by the lenses L20 and L30 is omitted and the recording surface 3 coincides with the rear focal plane RP of the fθ lens group L10. A result of this is another effect in addition to the effects promised in the first and the second preferred embodiments; that is, enhanced design simplicity of the optical system of the apparatus.

Figure 8:
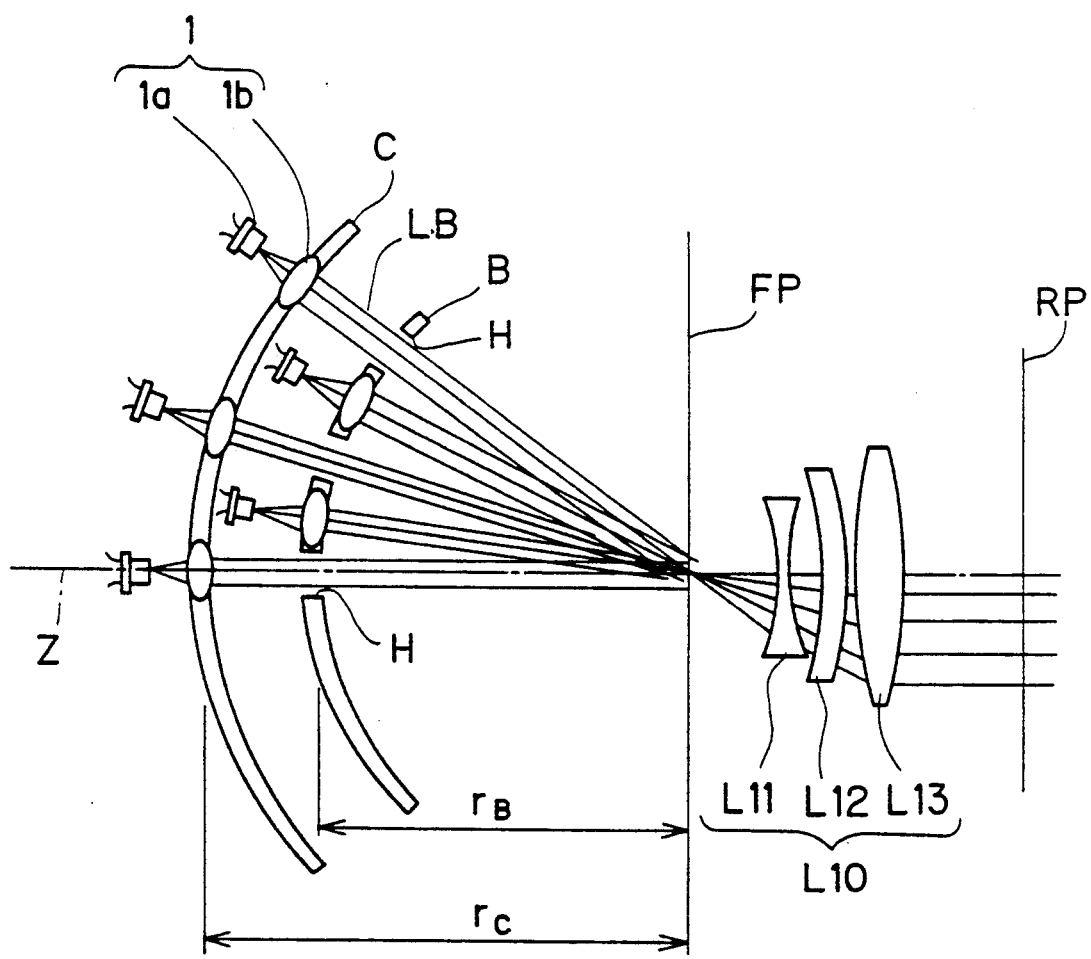
FIG. 8 is a schematic diagram of an apparatus for recording an image according to a fourth preferred embodiment of the present invention.

FIG. 8 shows an apparatus for recording an image with laser beams according to a fourth preferred embodiment of the present invention. The apparatus employs two holding members B and C in stead of the holding member A. The holding members B and C have spherical surfaces, the radius of curvature rB of the spherical surface in the holding member B being smaller than radius of curvature rC of spherical surface in the holding member C. Laser source units 1 are mounted at equal intervals on the holding members B and C. A plurality of through holes H are bored in the holding member B. Laser beams LB from the laser source units 1 attached to the holding member C pass through the through holes H and enter the fθ lens group L10.

With such a structure, the fourth preferred embodiment allows that a larger number of the laser source units 1 in an equidistantly-spaced relation are employed. An advantage of this structure is well appreciated where, like in the first preferred embodiment, it is difficult to mount a number of laser source units 1 on the holding member A. Although the fourth preferred embodiment is directed to where the laser source units i are mounted to the two holding members B and 0, three or more holding members each having a spherical surface may be alternatively used that mount the laser source units 1.

Figure 9:
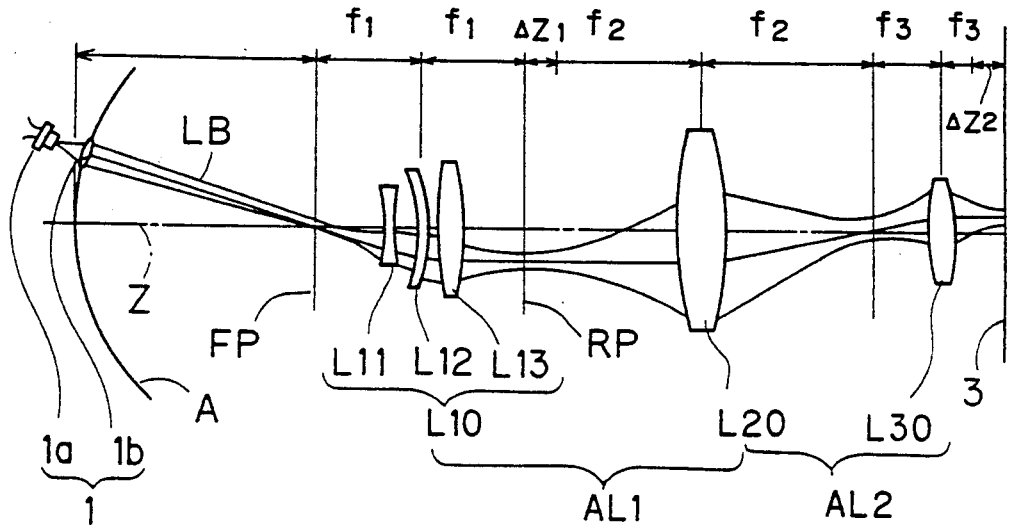
FIG. 9 is a schematic diagram of an apparatus for recording an image according to a fifth preferred embodiment of the present invention.

FIG. 9 shows an apparatus for recording an image with laser beams according to a fifth preferred embodiment of the present invention. Except a feature that the laser source units 1 are disposed such that a laser beam LB entering the fθ lens group L10 from each laser source unit 1 has a beam waist at the front focal point FP of the fθ lens group L10, the apparatus of the fifth preferred embodiment is similar to the apparatus of the first preferred embodiment. Optical characteristics obtained in the fifth preferred embodiment will be described according to the Gaussian beam propagation analysis.

In the apparatus of the fifth preferred embodiment, the beam waists of laser beams LB are each formed at focal points (on focal planes) of the respective lenses; more precisely, on the rear focal plane RP of the lens L10 (front focal plane of a lens L20), the rear focal plane of the lens L20 (front focal plane of a lens L30) and the rear focal plane of the lens L30 (recording surface 3). The principal ray of each laser beam LB advances the same course as in the first preferred embodiment.

In each laser beam LB, a beam diameter ω1 on the focal plane RP and a beam diameter ω2 on the recording surface 3 satisfy $$\omega2 = (f3/f2)\cdot\omega1 = m\cdot\omega1$$

where the symbols f2 and f3 are focal lengths of the lenses L20 and L30, respectively, and the symbol is the magnification of the afocal optical system AL2. At the same time, a beam pitch P1 of adjacent laser beams LB on the focal plane RP and a beam pitch P2 on the recording surface 3 are in a relation:

$$P2 = (f3/f2)\cdot P1 = m\cdot P1$$

Thus, while ensuring the effects promised in the first preferred embodiment, the apparatus of the fifth preferred embodiment produces a sharper image since the beam waists of the laser beams LB are formed on the recording surface 3. In addition, a beam spot diameter and a spot-to-spot distance on the recording surface 3 are varied by adjusting the magnification of the afocal optical system AL2.

Figure 10:
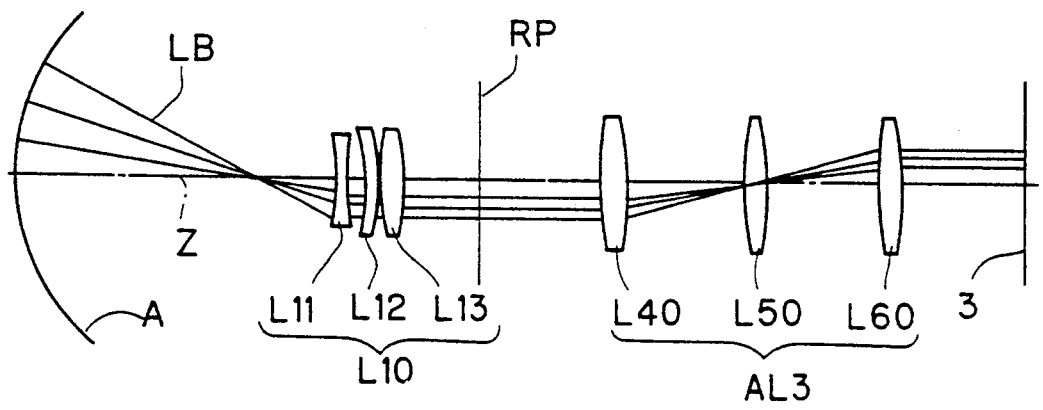
FIG. 10 is a schematic diagram of an apparatus for recording an image according to a sixth preferred embodiment of the present invention.

FIG. 10 shows an apparatus for recording an image with laser beams according to a sixth preferred embodiment of the present invention. In stead of the afocal optical system AL2, the apparatus of the sixth preferred embodiment comprises an afocal zoom system AL3 formed by lenses L40, L50 and L60. Driven by a driving unit (described later), the afocal zoom system AL3 successively changes its magnification.

Figure 11:
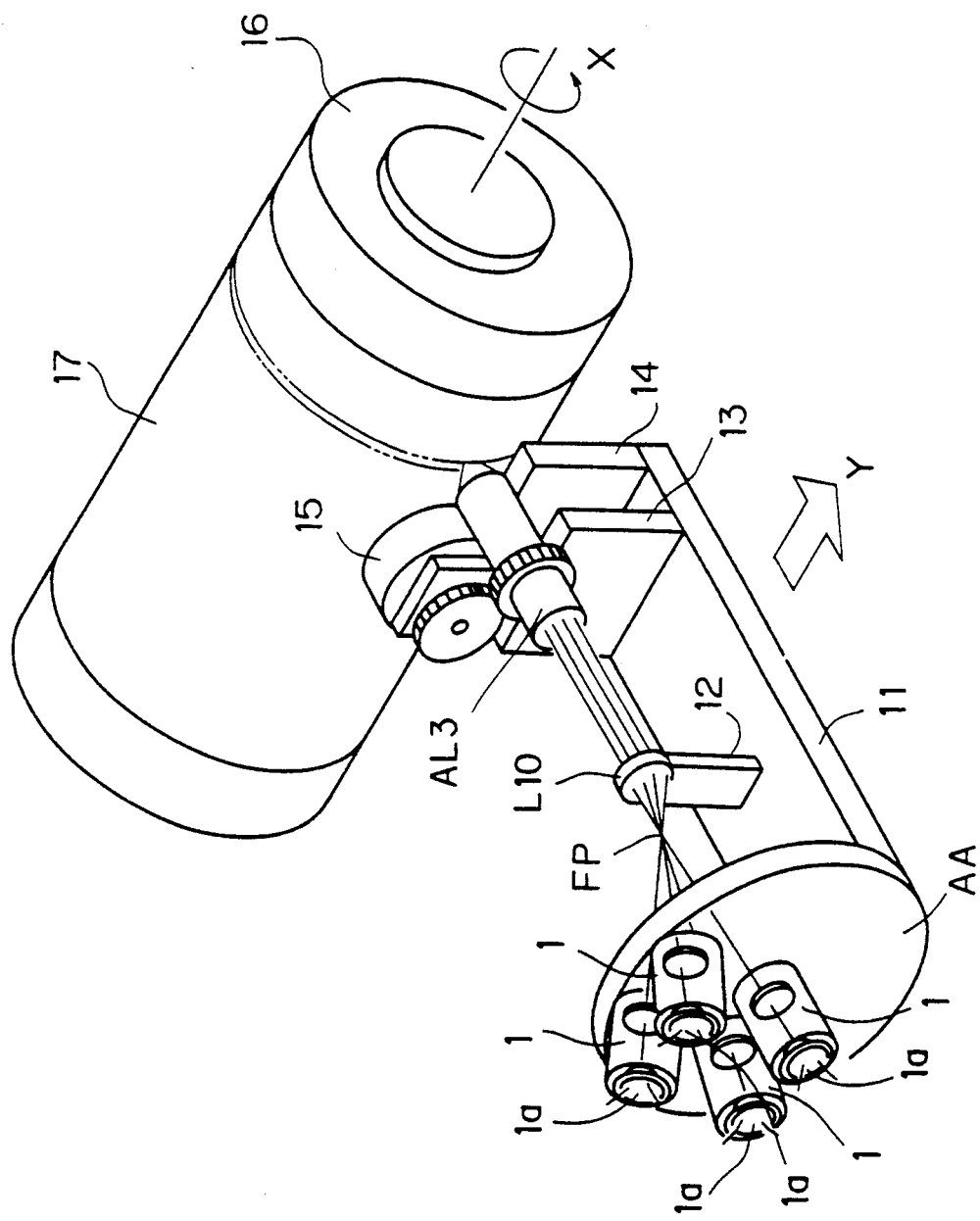
FIG. 11 is a perspective view of an apparatus for recording an image which comprises an afocal optical system.

FIG. 11 is a perspective view of the apparatus comprising the afocal zoom system AL3 of the sixth preferred embodiment. In FIG. 11, the apparatus comprises a movable table 11 which is capable of freely sliding in a subscanning direction Y. A holding member AA having a spherical surface as illustrated in FIG. 3 is fixed to the table 11. A plurality of laser source units 1 are mounted in a two dimensional arrangement on the holding member AA. As viewed in the direction of laser beam propagation, the fθ lens group L10 and the afocal zoom system AL3 are disposed in a spaced relation in that order. The fθ lens group L10 and the afocal zoom system AL3 are fixed to the table 11 by a holding member 12 and holding members 13 and 14, respectively. The afocal zoom system AL3 is coupled to a driving unit 15, so that the magnification of the optical system AL3 is changed by driving the driving unit 15.

The apparatus also comprises a rotation cylinder 16 which rotates in the main scanning direction X. The rotation cylinder 16 is disposed so that its curved surface coincides with an imaging plane of the afocal zoom system AL3. A semiconductor laser 1a is turned on and off in response to an image signal from a control unit (not shown), thereby allowing that a laser beam LB is modulated so as to correspond to an image to be recorded and passes through a front focal point FP of the fθ lens group L10 on the way to the fθ lens group L10. The laser beam LB from the lens L10 enters the afocal zoom system AL3 where it is reduced. Upon the reduction, the laser beam LB is projected onto a photosensitive material 17 wound around the rotation cylinder 16. The operation above is repeated successively, in synchronism with rotation of the rotation cylinder 16 in the direction X and slide movement of the table 11 in the direction Y, whereby an image is recorded on the photosensitive material 17.

Figure 12:
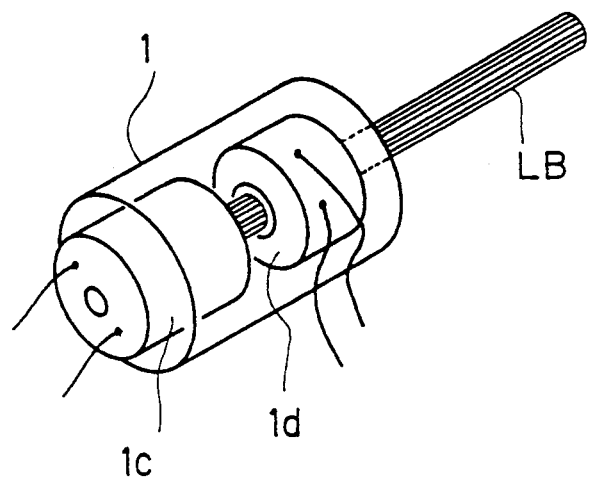
FIG. 12 shows a laser source unit as modified according to the present invention.

Although the sixth preferred embodiment uses the semiconductor laser 1a as a laser beam source, a solid state laser (e.g., YAG or combination of YAG and KTP) is also appropriate. If a solid state laser is desired for the laser source unit 1, the solid state laser needs to be used in combination with an external modulating element. For instance, a solid state laser 1c and an external modulating element 1d (FIG. 12). A laser beam from the solid state laser 1c is modulated by the modulating element 1d in accordance with the configuration of an image to be recorded. Alternatively, the combination for forming the laser source unit 1 may be a semiconductor laser, an second harmonic generation element (SHG element) and a beam shaping lens, or a semiconductor laser, a collimator lens and an external modulating element. It is also possible to produce a laser beam having a shorter wavelength when the laser source unit 1 of FIG. 3 is formed by the semiconductor laser 1a, the collimator lens 1b and an SHG element.

The foregoing has described the present invention in relation to the preferred embodiments where distances between adjacent beam spots are equalized by an fθ lens. The present invention does not necessarily depend on such a technique but produces the same result by modifying the arrangement of the laser source units 1 (seventh and eighth preferred embodiments).

Figure 13:
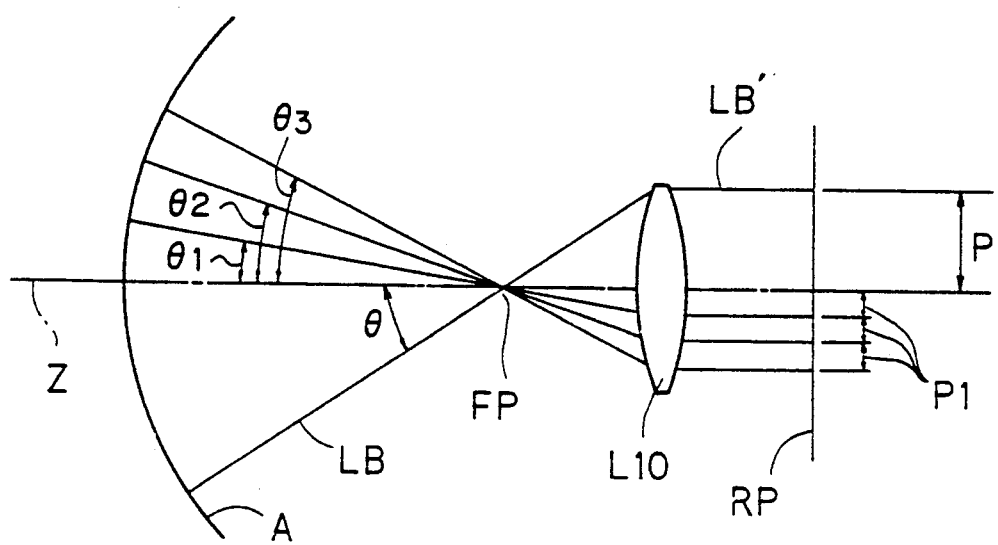
FIG. 13 is a schematic diagram showing a relation between a laser beam which is incident upon a lens and a laser beam which has passed through the lens.

Before describing the seventh and eighth preferred embodiments in detail, a relation between a laser beam to and a laser beam from a regular lens will be explained in connection with FIG. 13. Consider a reference plane which contains an optical axis Z (the plane of the drawing sheet of FIG. 13). Assuming that the principal ray of a laser beam LB passes through a front focal point FP of a lens L10 and enters the lens L10, a line drawn on the reference plane by projecting the laser beam LB onto the reference plane and the optical axis Z make an angle θ. In this case, a laser beam LB' from the lens L10 becomes parallel to the optical axis Z. A distance P between the laser beam LB' and the optical axis Z at an intermediate imaging plane (rear focal plane RP of the lens L10) is $P = f1 \cdot \tan \theta$ where the symbol f1 is a focal length of the lens L10. Hence, on the reference plane, if angles between three laser beams from the laser source units 1 and the optical axis Z are θ1, θ2 and θ3, distances P1, P2 and P3 between the laser beams and the optical axis are $P1 = f1 \cdot \tan \theta 1$ $P2 = f1 \cdot \tan \theta 2$ $P3 = f1 \cdot \tan \theta 3$ Now, assuming that the distances P1, P2 and P3 satisfy, $P2 = 2 \cdot P1$ $P3 = 3 \cdot P1$ beam pitches of the laser beams are equally P1 on the intermediate imaging plane. In other words, by placing the laser source units 1 on the holding member A so that the angles θ1, θ2 and θ3 satisfy the relations below, the beam pitches on the intermediate imaging plane (rear focal plane of the lens L10) become equal, similarly to the first to the sixth preferred embodiments.

Figure 14:
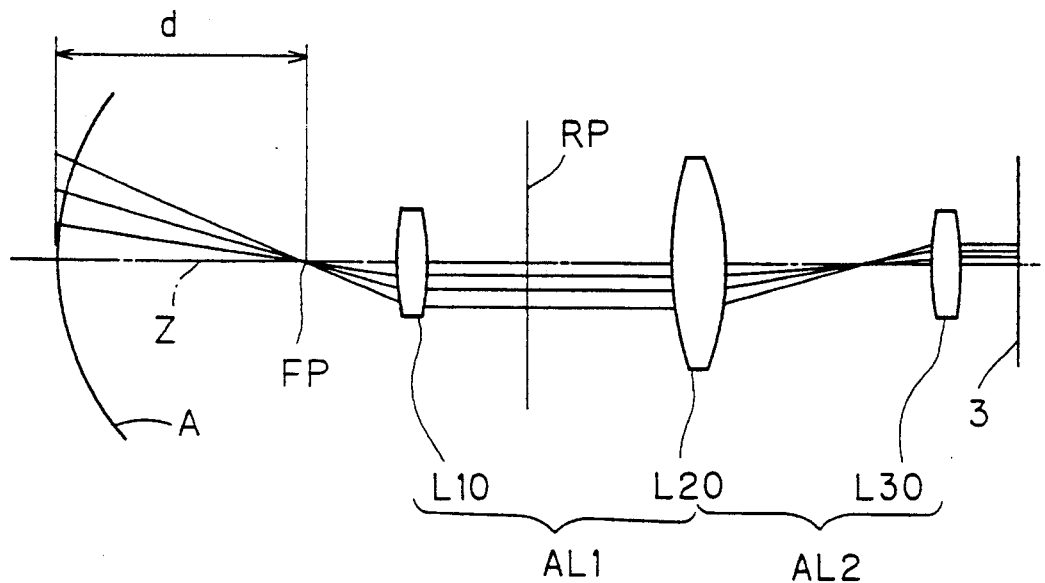
FIG. 14 is a schematic diagram of an apparatus for recording an image according to a seventh preferred embodiment of the present invention.

$\theta 1 = \tan^{-1} (P1/f1)$ $\theta 2 = \tan^{-1} (2 \cdot P1/f1)$ $\theta 3 = \tan^{-1} (3 \cdot P1/f1)$ FIG. 14 shows an apparatus for recording an image with laser beams according to a seventh preferred embodiment of the present invention. In the apparatus of the seventh preferred embodiment, the laser source units 1 are mounted on the holding member A so that an angle θ between a laser beam from each laser source unit 1 and the optical axis Z satisfies $\theta = \tan^{-1} (n \cdot P1/f1)$ where n is a natural number. Thus, distances between beam spots on the rear focal plane RP of the lens L10 (intermediate imaging position) are equally P1. An intermediate image formed on the plane RP (i.e., the beam pots) is then reduced to a predetermined magnification by the afocal optical system AL2 and focused onto the recording surface 3.

Figure 15:
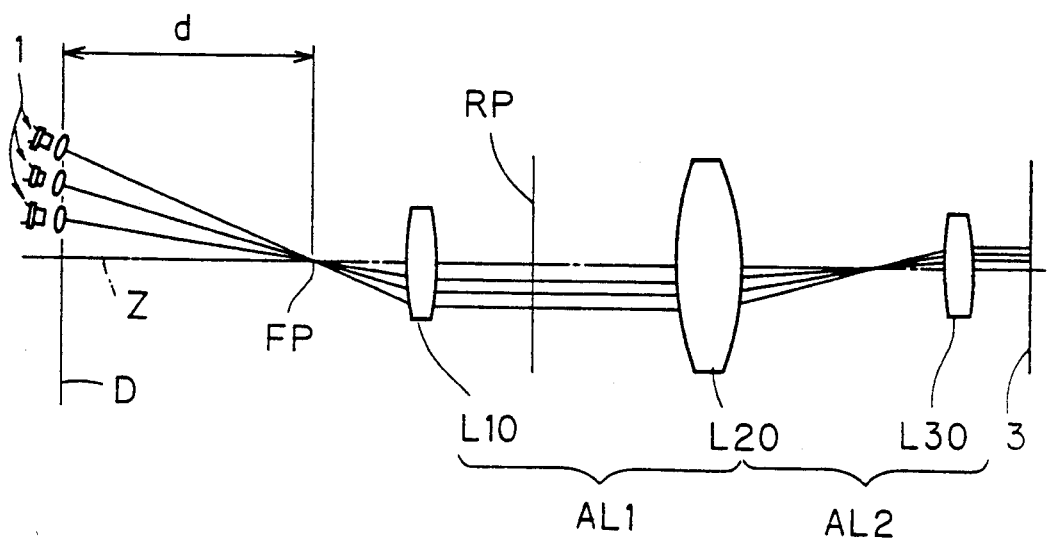
FIG. 15 is a schematic diagram of an apparatus for recording an image according to a eighth preferred embodiment of the present invention.

FIG. 15 shows an apparatus for recording an image with laser beams according to an eighth preferred embodiment of the present invention. Different from the seventh preferred embodiment where the laser source units 1 are disposed on the holding member A, the eighth preferred embodiment requires that the laser source units 1 are mounted at equal intervals on a flat plane D which is far from the front focal point FP of the lens L10 by a distance d and which is perpendicular to the optical axis Z. The apparatuses of the seventh and the eighth preferred embodiments are otherwise the same.

Similarly to the seventh preferred embodiment, the apparatus of the eighth preferred embodiment satisfies $\theta = \tan^{-1} (n \cdot P1/f1)$ where like symbols have like definitions. Hence, the same effects as promised in the seventh preferred embodiment are ensured.

Although the first, the second, the fifth, the seventh and the eighth preferred embodiments (FIG. 3, FIG. 6, FIG. 9, FIG. 14 and FIG. 15) each require that the lenses L10 and L20 form an afocal optical system, this is not a design consideration that is absolutely necessary. In the apparatus of FIG. 9 (fifth preferred embodiment), for example, the effect as described earlier is not lost even if the lenses L10 and L20 do not form an afocal optical system. In the fifth preferred embodiment, the apparatus satisfies $$\Delta z2 = (f3/f2)^2 \cdot \Delta z1 = m^2 \cdot \Delta z1$$

where the symbol $\Delta z1$ is a distance between the rear focal plane RP of the $f\theta$ lens group L10 and the front focal plane of the lens L20 and the symbol $\Delta z2$ is a distance between the rear focal plane of the lens L30 and the beam waist forming position. Hence, the recording surface 3 may be disposed away from the rear focal plane of the lens L30 by the distance $\Delta z2$.

Thus, the lenses L10 and L20 are narrowly spaced from each other when they do not have to form an afocal optical system. This enables reduction in the overall size of the apparatus.

While the invention has been shown and described in detail, the foregoing description is in all aspects illustrative and not restrictive. It is understood that numerous modifications and variations can be devised without departing from the scope of the invention.

We claim:

1. An apparatus for recording an image on a recording surface with a plurality of laser beams, comprising:
   a plurality of laser source units each for emitting a laser beam;
   a holding member for holding said laser source units; and
   a first lens, disposed between said laser source units and said recording surface, for directing said laser beam from each of said laser source units to said recording surface,
   wherein said holding member has a spherical surface with a center point which coincides with a front focal point of said first lens on which said laser source units are each disposed in such a manner that the principal ray of said laser beam therefrom passes through said front focal point of said first lens, said laser source units are arranged at equal intervals in a direction on said spherical surface, and said first lens includes an $f\theta$ lens.

2. An apparatus of claim 1, wherein said afocal optical system includes a zoom lens.

3. An apparatus of claim 1, wherein said recording surface is located on a rear focal plane of said first lens.

4. An apparatus of claim 1, further comprising an afocal optical system located between said first lens and said recording surface.

5. An apparatus of claim 4, wherein a front focal plane of said afocal optical system coincides with a rear focal plane of said first lens.

6. An apparatus of claim 5, wherein said recording surface is located on a rear focal plane of said afocal optical system.

7. An apparatus of claim 6, wherein each of said laser beams from said laser source units has a beam waist at said front focal point of said first lens.

8. An apparatus for recording an image on a recording surface with a plurality of laser beams, comprising:
   a plurality of laser source units each for emitting a laser beam;
   a holding member for holding said laser source units;
   first lens means, which includes an $f\theta$ lens, disposed between said laser source units and said recording surface, for directing a laser beam from each of said laser source units to said recording surface; and
   an afocal optical system located between said first lens means and said recording system and includes an $f\theta$ lens disposed immediately close to said recording surface,
   wherein said holding member has a spherical surface with a center point that coincides with a front focal point of said first lens means on which said laser source units are arranged at equal intervals in a direction on said spherical surface in such a manner that the principal ray of the laser beam from each unit passes through said front focal point of said first lens means.

* * * * *